(12) United States Patent
Ramesh et al.

(10) Patent No.: US 7,858,190 B2
(45) Date of Patent: Dec. 28, 2010

(54) THERMOSETTING COATING COMPOSITIONS WITH MULTIPLE CURE MECHANISMS

(75) Inventors: Swaminathan Ramesh, Canton, MI (US); Sunitha Grandhee, Novi, MI (US)

(73) Assignee: BASF Coatings GmbH, Muenster (DE)

( * ) Notice: Subject to any disclaimer, the term of this patent is extended or adjusted under 35 U.S.C. 154(b) by 1301 days.

(21) Appl. No.: 11/227,866

(22) Filed: Sep. 15, 2005

(65) Prior Publication Data

US 2007/0059532 A1    Mar. 15, 2007

(51) Int. Cl.
B32B 27/40    (2006.01)
B05D 1/40    (2006.01)
C09J 133/00    (2006.01)

(52) U.S. Cl. .................... 428/423.1; 156/327; 427/331
(58) Field of Classification Search ............. 428/423.1; 156/327; 427/331
See application file for complete search history.

(56) References Cited

U.S. PATENT DOCUMENTS

| | | | |
|---|---|---|---|
| 5,013,770 A | 5/1991 | Carpenter et al. | |
| 5,256,706 A | 10/1993 | Carpenter et al. | |
| 5,312,943 A | 5/1994 | Gaglani | |
| 5,336,566 A | 8/1994 | Rehfuss | |
| 5,356,669 A | 10/1994 | Rehfuss et al. | |
| 5,384,367 A * | 1/1995 | Swarup et al. | 525/169 |
| 5,426,132 A | 6/1995 | Gaglani | |
| 5,451,656 A | 9/1995 | Menovcik et al. | |
| 5,508,379 A | 4/1996 | Menovcik et al. | |
| 5,512,639 A | 4/1996 | Rehfuss et al. | |
| 5,523,443 A | 6/1996 | Gaglani | |
| 5,532,061 A | 7/1996 | Menovcik et al. | |
| 5,639,828 A | 6/1997 | Briggs et al. | |
| 5,693,723 A | 12/1997 | Green | |
| 5,693,724 A | 12/1997 | Green | |
| 5,872,195 A | 2/1999 | Green et al. | |
| 5,985,463 A | 11/1999 | Lin et al. | |
| 5,994,479 A | 11/1999 | Green et al. | |
| 6,080,825 A | 6/2000 | Ohrbom et al. | |
| 6,084,038 A | 7/2000 | Ohrbom et al. | |
| 6,534,588 B1 | 3/2003 | Löcken et al. | |
| 6,551,712 B2 | 4/2003 | Barsotti et al. | |
| 6,551,713 B2 | 4/2003 | Barsotti et al. | |
| 6,558,745 B2 | 5/2003 | Barsotti et al. | |
| 6,562,893 B2 | 5/2003 | Barsotti et al. | |
| 6,642,311 B2 | 11/2003 | Barsotti et al. | |
| 6,653,394 B1 | 11/2003 | Meisenburg et al. | |
| 7,250,480 B2 * | 7/2007 | Ramesh et al. | 526/319 |
| 2001/0046301 A1 | 11/2001 | Nakamura et al. | |
| 2002/0006514 A1 * | 1/2002 | Webster et al. | 428/412 |
| 2004/0087728 A1 | 5/2004 | Campbell et al. | |
| 2005/0054767 A1 | 3/2005 | Darling et al. | |

FOREIGN PATENT DOCUMENTS

| | | |
|---|---|---|
| EP | 0915113 A1 | 5/1999 |
| EP | 0995778 A2 | 4/2000 |
| JP | 09-323483 | 12/1997 |
| WO | WO 99/40140 A1 | 2/1999 |
| WO | WO 00/55229 A1 | 9/2000 |
| WO | WO 01/07376 A1 | 2/2001 |
| WO | WO 02/32982 A1 | 4/2002 |
| WO | 2006063304 A1 | 6/2006 |

OTHER PUBLICATIONS

International Search Report and the Written Opinion of the International Searching Authorite for PCT/US2006/033040 filed Aug. 24, 2006.

* cited by examiner

*Primary Examiner*—Thao T. Tran
(74) *Attorney, Agent, or Firm*—Harness, Dickey & Pierce, P.L.C.

(57) ABSTRACT

A curable coating composition comprises (a) a compound having two types of functionality, functionality A and functionality B, that react in curing the coating, (b) a second material having functionality C that reacts with functionality A in curing the coating, and (c) a crosslinker having a plurality of functional groups D that react at least with functionality B in curing the coating. Functional groups D may also react with functionality C and/or with a functional group formed as a result of the reaction of functionality C with functionality A. The curable coating composition is applied to a substrate and cured under conditions appropriate for reactions of the functionalities A, B, C, and D.

20 Claims, No Drawings

THERMOSETTING COATING COMPOSITIONS WITH MULTIPLE CURE MECHANISMS

FIELD OF THE INVENTION

The invention relates to thermosetting coating compositions, materials therefor, and methods of making and using such coatings compositions.

BACKGROUND OF THE INVENTION

Curable, or thermosettable, coating compositions are widely used in the coatings art, particularly for topcoats in the automotive and industrial coatings industry. Color-plus-clear composite coatings provide topcoats with exceptional gloss, depth of color, distinctness of image, and special metallic effects. The automotive industry has made extensive use of these coatings for automotive body panels. A topcoat coating should be durable to maintain its appearance and provide protection under service conditions during the lifetime of the coated article. Topcoat coatings for automotive vehicles, for example, are typically exposed to all kinds of weather, ultraviolet rays from the sun, abrasions from gravel thrown up during driving or from items set on the car when parked, and other conditions that can degrade the coating. For some time, researchers have directed their efforts to providing coatings with greater resistance to environmental etch. "Environmental etch" is a term applied to a kind of exposure degradation that is characterized by spots or marks on or in the finish of the coating that often cannot be rubbed out.

Curable coating compositions utilizing carbamate-functional resins are described, for example, in U.S. Pat. Nos. 5,693,724, 5,693,723, 5,639,828, 5,512,639, 5,508,379, 5,451,656, 5,356,669, 5,336,566, and 5,532,061, each of which is incorporated herein by reference. These coating compositions can provide significant improvements in resistance to environmental etch over other coating compositions, such as hydroxy-functional acrylic/melamine coating compositions. On the other hand, carbamate-functional resins tend to require more organic solvent to achieve acceptable viscosity for application and leveling of the applied film to obtain desired smoothness. Coatings with higher amounts of organic solvent produce more regulated emissions during application. Coatings with hydroxyl-functional acrylic polymers cured using blocked polyisocyanate can also provide excellent resistance to environmental etch in cured coatings, but these coatings do not have the desired scratch and mar resistance. Coatings with hydroxyl-functional acrylic polymers cured using aminoplasts can be formulated at higher solids and cured at lower temperatures relative to the other compositions mentioned, but do not provide the environmental etch resistance or scratch and mar resistance of the other coatings. Other coating chemistries have been used, but these also have shortcomings, such as poor weathering properties or high volatile organic content [VOC].

It would be advantageous to have a coating composition that could provide desired environmental etch resistance and improved scratch and mar resistance without dramatically increasing the viscosity of the coating composition.

SUMMARY OF THE INVENTION

The present invention provides a curable coating composition comprising (a) a compound having two types of functionality, functionality A and functionality B, that react in curing the coating, (b) a second material having functionality C that reacts with functionality A in curing the coating, and (c) a crosslinker having a plurality of functional groups D that react at least with functionality B in curing the coating. Functional groups D may also react with functionality C and/or with a functional group formed as a result of the reaction of functionality C with functionality A. The curable coating composition is applied to a substrate and cured under conditions appropriate for reactions of the functionalities A, B, C, and D. The conditions may be adjusted for the cure or during the cure to promote sequential reactions (that is, reaction of one of functionalities A or B substantially prior to the other). Depending on the reactivities of the functional groups, some of them may be blocked to reduce viscosity build up during storage as well as to control the direction of reaction during cure.

As used in this description of the present invention, "compound" is used to refer to a material that is monomeric; i.e., a material that is not an oligomer or a polymer. "Material" is used in a more general sense to include compounds, oligomers, and polymers.

In one embodiment, the curable coating composition comprises (a) a compound having carboxylic acid and carbamate functionality, (b) a material having epoxide functionality, and (c) an aminoplast crosslinker.

In a second embodiment, the curable coating composition comprises (a) a compound having isocyanate functionality and silyl ether functionality, (b) a material having primary and/or secondary amine functionality, and (c) a hydroxyl-functional crosslinker.

In a third embodiment, the curable coating composition comprises (a) a compound having isocyanate functionality and silyl ether functionality, (b) a material having secondary hydroxyl functionality, and (c) a crosslinker having primary hydroxyl functionality.

In a fourth embodiment, the curable coating composition comprises (a) a compound having hydroxyl functionality and silyl ether functionality, (b) a material having isocyanate functionality, and (c) a hydroxyl-functional crosslinker.

In a fifth embodiment, the curable coating composition comprises (a) a compound having epoxide functionality and carbamate functionality, (b) a material having carboxylic acid functionality, and (c) an aminoplast crosslinker.

In a sixth embodiment, the curable coating composition comprises (a) a compound having alkoxyalkyl amino functionality and carbamate functionality, (b) a material having hydroxyl functionality, and (c) an aminoplast crosslinker.

In a seventh embodiment, the curable coating composition comprises (a) a compound having isocyanate functionality and carbamate functionality, (b) a material having hydroxyl functionality, and (c) an aminoplast crosslinker.

In an eighth embodiment, the curable coating composition comprises (a) a compound having isocyanate functionality and ethylenic unsaturation, (b) a material having hydroxyl functionality, and (c) an ethylenically unsaturated crosslinker with a photocatalyst. This composition cures with heat and actinic radiation.

An aminoplast for purposes of the invention is a material obtained by reaction of an activated nitrogen with a lower molecular weight aldehyde forming an alkylol group, optionally further reacted with an alcohol (preferably a mono-alcohol with one to four carbon atoms) to form an ether group.

A carbamate group has a structure

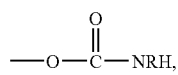

in which R is H or alkyl. Preferably, R is H or alkyl of from 1 to about 4 carbon atoms, and more preferably R is H.

The invention also provides a method of coating a substrate including steps of applying a coating composition of the invention and curing the applied layer of coating composition and a coated substrate formed by the method.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The curable coating composition comprises (a) a compound having functionality A and functionality B that react in curing the coating, (b) a second material having functionality C that reacts with functionality A in curing the coating, and (c) a crosslinker having a plurality of functional groups D that react at least with functionality B in curing the coating. Functional groups D may also react with functionality C and/or with a functional group formed as a result of the reaction of functionality C with functionality A.

Compound (a) has at least one group of functionality A and at least one group of functionality B, but may have a plurality of groups of functionality A and/or functionality B. Compound (a) may be formed in general by using a starting compound having one of the functionalities and partially converting that functionality to the other functionality or by reacting a starting compound with a combination of a compound that provides one functionality and a compound that provides the other functionality. If the two functionalities are reactive with one another, then one of the functionalities must be protected with a blocking group.

Material (b) may be a compound, an oligomer, or a polymer. A compound having the desired functionality C may be commercially available, or it may be prepared by reaction of a first compound with a second compound that produces the desired functionality C. When material (b) is a compound, it has preferably at least 2, more preferably from 2 to about 20, even more preferably from 2 to about 8, and still in one embodiment more preferably from about 2 to about 4, and in another embodiment preferably 3 functional groups C. An oligomer or polymer having the desired functionality C may be prepared by polymerization of a monomer having the desired functional group C or by adducting the polymer or oligomer after polymerization to produce functional groups C. For example and without limitation, polymerized materials (b) may be acrylic polymers, polyurethane polymers, polyester polymers, star polyesters, epoxies, and polyethers.

Crosslinker (c) should have a plurality of functional groups D. Crosslinker (c) has preferably from 2 to 20, more preferably from 2 to 8, still more preferably from 2 to 6, and even more preferably from 2 to 4 functional groups D available for reaction with compound (a).

The curable coating composition may be applied in a coating layer to a substrate and then cured. The curing conditions are appropriate for reaction of the functional groups A, B, C, and D. The curing conditions are adjusted to promote substantially sequential reactions of one of the functionalities of compound (a), so that at the beginning of cure only one of the functionalities is reacting. The applied coating layer is cured to produce a coated substrate.

In one embodiment, the curable coating composition comprises (a) a compound having carboxylic acid and carbamate functionality, (b) a material having epoxide functionality, and (c) an aminoplast crosslinker.

In this embodiment, the compound (a) has carboxylic acid and carbamate groups. The compound having acid and carbamate groups may have one acid group per 0.5 to 1.5 carbamate groups, on average, but it is preferred that the compound have substantially about the same acid equivalent weight and carbamate equivalent weight. The compound preferably is monomeric and has at least a molecular weight of 119 and up to about 40 carbon atoms. In certain embodiments, the compound has one carbamate group and one acid group, but in other embodiments the compound has more than one carbamate group, more than one acid group, or more than one acid group and more than one carbamate group. In particular, the compound having acid and carbamate groups may be a reaction product of a carboxylic acid anhydride compound and a hydroxyalkyl carbamate. Examples of suitable anhydrides compounds include, without limitation, phthalic anhydride, tetrahydrophthalic anhydride, succinic anhydride, glutaric anhydride, dimethyl succinic anhydride, maleic anhydride, trimellitic anhydride, pyromellitic anhydride, hexahydrophthalic anhydride, and methyl, hexahydrophthalic anhydride. Examples of suitable hydroxyalkyl carbamate compounds include, without limitation, hydroxyethyl carbamate, hydroxypropyl carbamate, hydroxybutyl carbamate, and a beta-hydroxy carbamate compound derived from glycidyl carbonate ester of neodecanoic acid and ammonia. The ring opening reaction of an anhydride and the hydroxy, carbamate leads to a monomer with at least one carboxylic acid and one carbamate group.

The material (b) having epoxide functionality may be a compound, an oligomer, or a polymer having at least one, preferably a plurality of epoxide groups. Examples of compounds having epoxide functionality include, without limitation, epoxide ethers of alcohols and polyols and epoxide esters of monocarboxylic acids, polycarboxylic acids, and polyacrylic polymers made with glycidyl methacrylate or other glycidyl-functional, addition polymerizable monomers.

Examples of suitable oligomers having epoxide functionality are bisphenol diglycidyl ethers, trimethylolpropane triglycidyl ether, pentaerythritol tetraglycidyl ethers, and triglycidylisocyanurate (also known as TGIC). Examples of suitable polymers include, without limitation, epoxide-functional acrylic polymers, epoxide-functional polyester polymers, and epoxide functional polyurethanes. The epoxide-functional polymer preferably has an epoxide equivalent weight from about 300 to about 1500.

The acrylic polymer may be produced by copolymerizing an appropriate amount of a glycidyl-group monomer(s), for example by copolymerizing one or more of the monomers glycidyl acrylate, glycidyl methacrylate, or allyl glycidyl ether. The polyester or polyurethane with epoxide functionality may be produced by reacting a polyester or polyurethane with hydroxyl or acid functionality with epichlorohydrin. The acrylic polymers may be polymerized using one or more further comonomers. Examples of such comonomers include, without limitation, esters of α,β-ethylenically unsaturated monocarboxylic acids containing 3 to 5 carbon atoms such as acrylic, methacrylic, and crotonic acids and of α,β-ethylenically unsaturated dicarboxylic acids containing 4 to 6 carbon atoms; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as dialkyl fumaric, maleic, and itaconic esters, prepared with alcohols such as methanol, ethanol, propanol, isopropanol, butanol, isobutanol, and tert-butanol. Representative examples of co-polymerizable vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, .alpha.-methyl styrene, vinyl toluene, tert-butyl styrene, and 2-vinyl pyrrolidone. The comonomers may be used in any combination. Monomers that are reactive with epoxide groups under the polymerization conditions should be avoided.

The acrylic polymers may be prepared using conventional techniques, such as by heating the monomers in the presence of a polymerization initiating agent and optionally chain transfer agents. The polymerization is preferably carried out in solution, although it is also possible to polymerize the acrylic polymer in bulk. Suitable polymerization solvents include, without limitation, esters, ketones, ethylene glycol monoalkyl ethers and propylene glycol monoalkyl ethers, alcohols, and aromatic hydrocarbons.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

The solvent or solvent mixture is generally heated to the reaction temperature and the monomers and initiator(s) and optionally chain transfer agent(s) are added at a controlled rate over a period of time, typically from about two to about six hours. The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture is usually held at the reaction temperature after the additions are completed for a period of time to complete the polymerization. Optionally, additional initiator may be added to ensure complete conversion of monomers to polymer.

The acrylic, polyester, and polyurethane polymers should have a weight average molecular weight of at least about 500, preferably at least about 3000, more preferably at least about 3500, and particularly preferably at least about 4000. Weight average molecular weight may be determined by gel permeation chromatography using polystyrene standard. In addition, the weight average molecular weight is preferably up to about 7000, more preferably up to about 5000, and still more preferably up to about 4500.

While a wide range of weight ratios are possible for formulating with the combinations of materials (a), (b), and (c), certain embodiments may include from about 1 to about 10 parts by weight of material (a), from about 3 to about 20 parts by weight of material (b), and from about 0.5 to about 3 parts by weight of material (c), The ratios may be adjusted based on the equivalent weights of the individual materials and the extent to which it is desired for the reactions to proceed, as well as the degree of cure desired. The composition may further include a fatty acid material for increased flexibility of the cured paint film.

The coating composition of the first embodiment also includes an aminoplast as a crosslinker. An aminoplast for purposes of the invention is a material obtained by reaction of an activated nitrogen with a lower molecular weight aldehyde, optionally further reacted with an alcohol (preferably a mono-alcohol with one to four carbon atoms) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups.

The activated nitrogen is reacted with a lower molecular weight aldehyde. The aldehyde may be selected from formaldehyde, acetaldehyde, crotonaldehyde, benzaldehyde, or other aldehydes used in making aminoplast resins, although formaldehyde and acetaldehyde, especially formaldehyde, are preferred. The activated nitrogen groups are at least partially alkylolated with the aldehyde, and may be fully alkylolated; preferably, the activated nitrogen groups are fully alkylolated. The reaction may be catalyzed by an acid, e.g. as taught in U.S. Pat. No. 3,082,180, the contents of which are incorporated herein by reference.

The alkylol groups formed by the reaction of the activated nitrogen with aldehyde may be partially or fully etherified with one or more monofunctional alcohols. Suitable examples of the monofunctional alcohols include, without limitation, methanol, ethanol, propanol, isopropanol, butanol, isobutanol, tert-butyl alcohol, benzyl alcohol, and so on. Monofunctional alcohols having one to four carbon atoms and mixtures of these are preferred. The etherification may be carried out, for example, by the processes disclosed in U.S. Pat. Nos. 4,105,708 and 4,293,692, the disclosures of which are incorporated herein by reference.

It is preferred for the aminoplast to be at least partially etherified, and especially preferred for the aminoplast to be fully etherified. The preferred compounds have a plurality of methylol and/or etherified methylol groups, which may be present in any combination and along with unsubstituted nitrogen hydrogens. Fully etherified melamine-formaldehyde resins are particularly preferred, for example and without limitation hexamethoxymethyl melamine.

In a second embodiment, the curable coating composition comprises (a) a compound having isocyanate functionality and silyl ether functionality, (b) a material having primary and/or secondary amine functionality, and (c) a hydroxyl-functional crosslinker.

The compound (a) having isocyanate functionality and ether functionality may be, for example, isocyanatopropyl-trimethoxysilane.

The material (b) having primary and/or secondary amine functionality may be a compound, an oligomer, or a polymer having at least one, preferably a plurality of such amine groups having active hydrogens. Examples of compounds having primary and/or secondary amine functionality include, without limitation, diethylene triamine, triaminoalkanes ($C_8$, $C_9$, $C_{10}$ etc. all primary, various isomers), isophorone diamine, and 1,4-diaminocyclohexane.

Examples of suitable oligomers having primary and/or secondary amine functionality are triethylenetetramine, methylene dianiline oligomers (MDA oligomers), and dendrimeric compounds made from reacting protected diethylene triamine with isocyanurates followed by removing the protection. Examples of suitable polymers include, without limitation, primary and/or secondary amine-functional acrylic polymers. The amine-functional polymer preferably has an equivalent weight from about 300 to about 1500. The acrylic polymer may be produced by copolymerizing an appropriate amount of a primary and/or secondary amine group-containing monomer(s) with one or more further addition polymerizable monomers.

Examples of suitable hydroxyl-functional crosslinkers (c) include, without limitation, triols like glycerols, tetrols like pentaerythritols, hydroxy functional acrylic polymers.

In a third embodiment, the curable coating composition comprises (a) a compound having isocyanate functionality and silyl ether functionality, (b) a material having secondary hydroxyl functionality, and (c) a crosslinker having primary hydroxyl functionality.

Compounds (a) having isocyanate functionality and silyl ether functionality have already been described.

The material (b) having secondary hydroxyl functionality may be a compound, an oligomer, or a polymer having at least one, preferably a plurality of such secondary hydroxyl groups. Examples of compounds having secondary hydroxyl groups include, without limitation, 2,3-butanediol, 2,3-pentanediol, 2,4-pentanediol, 2,3,4-pentanetriol, 2,3,4- and 2,3,5-hexanetriols.

Examples of suitable oligomers having secondary hydroxyl functionality are mono-, di-, tri-, and tetra-saccharides. Examples of suitable polymers include, without limitation, secondary hydroxyl-functional acrylic polymers made with hydroxypropyl acrylate or methacrylate. The secondary hydroxyl-functional polymer preferably has an equivalent weight from about 300 to about 1500. The acrylic polymer may be produced by copolymerizing an appropriate amount of secondary hydroxyl group-containing monomer(s), for example by copolymerizing with one or more monomers such as methyl methacrylate, butyl methacrylate, and styrene.

Examples of suitable primary hydroxyl-functional crosslinkers (c) include, without limitation, pentaerythritol, star polyester polyols, dendrimeric polyols from dimethylolpropionic acid or from trimethylolpropane, and dimethylolpropionic acid.

In a fourth embodiment, the curable coating composition comprises (a) a compound having hydroxyl or amino functionality and silyl ether functionality, (b) a material having isocyanate functionality, and (c) a crosslinker having hydroxyl functionality.

Compounds (a) having hydroxyl or amino functionality and silyl ether functionality include, without limitation, bis (2-hydroxyethyl)-3-aminopropyl-triethoxysilane, hydroxymethyltriethoxysilane, 4-aminobutyltriethoxysilane, 3-aminopropyltrimethoxysilane, N-(2-aminoethyl)3-aminopropylmethyl-dimethoxysilane, and aminophenyltri-methoxysilane, The material (b) having isocyanate functionality may be a compound, an oligomer, or a polymer having at least one, preferably a plurality of isocyanate groups. Examples of compounds and oligomers having isocyanate groups include, without limitation, diisocyanates such as hexamethylene diisocyanate and isophorone diisocyanates; isocyanurates, biurets, allophanates, and uretdiones of diisocyanates, and isocyanate-functional prepolymers such as the reaction product of one mole of a triol with three moles of a diisocyanate.

Examples of suitable polymers include, without limitation, isocyanate-functional acrylic polymers made by copolymerizing isocyanate-containing acrylate or methacrylate monomers like 2-isocyanatomethylmethacrylate, 2-isocyanatoethylmethacrylate or benzene, 1-(1-isocyanato-1-methyl ethyl)-4-1-methyl ethynyl)) or commonly known as meta TMI with other comonomers such as methylmethacrylate, styrene, butylmethacrylate. The isocyanate-functional polymer preferably has an equivalent weight from about 300 to about 1500.

Examples of suitable hydroxyl-functional crosslinkers (c) include, without limitation, ethylene glycol, glycerin, pentaerythritol, hydroxy functional acrylic polymers, polyester polyols, and polyurethane polyols.

In a fifth embodiment, the curable coating composition comprises (a) a compound having epoxide functionality and carbamate functionality, (b) a material having carboxylic acid functionality, and (c) an aminoplast crosslinker.

Compounds (a) having epoxide functionality and carbamate functionality include, without limitation, the epoxide of hydroxypropylcarbamate acrylate monomer or epoxide of hydroxyethylcarbamate acrylate monomer. These compounds may be prepared by reacting epichlorohydrin with hydroxypropyl carbamate. They can also be prepared by epoxidizing hydroxypropylcarbamate acrylate monomer or hydroxyethylcarbamate acrylate monomer.

The material (b) having carboxylic functionality may be a compound, an oligomer, or a polymer having at least one, preferably a plurality of carboxylic acid groups. Examples of compounds having carboxylic acid functionality include, without limitation, hexanoic acid, 2-hydroxystearic acid, hexahydrophthalic acid, succinic acid, and glutaric acid.

Examples of suitable oligomers and polymers include, without limitation, branched polyester carboxylic acids and carboxylic acid-functional acrylic polymers. The carboxylic acid-functional polymer preferably has an equivalent weight from about 300 to about 1500. Oligomers can be made by reacting branched alcohols (simple to hyperbranched) with suitable anhydrides. The acrylic polymer may be produced by copolymerizing an appropriate amount of an ethylenically unsaturated carboxylic acid compound, for example by copolymerizing one or more of the monomers acrylic acid, methacrylic acid, crotonic acid, maleic acid (or maleic anhydride, followed by hydrolysis of the anhydride to the acid).

Aminoplast crosslinkers have already been described.

In a sixth embodiment, the curable coating composition comprises (a) a compound having alkoxyalkyl amino functionality and carbamate functionality, (b) a material having hydroxyl functionality, and (c) an aminoplast crosslinker.

Compounds (a) having alkoxyalkyl amino functionality and carbamate functionality include, without limitation, partially defunctionalized aminoplasts. These compounds may be prepared by reacting aminoplasts with less than equivalent amounts of alkyl carbamates.

The material (b) having hydroxyl functionality may be a compound, an oligomer, or a polymer having at least one, preferably a plurality of hydroxyl groups. Examples of compounds having hydroxyl functionality include, without limitation, glycols, glycerols, pentaerythritol, dulcitols, starch, and so on.

Examples of suitable oligomers and polymers include, without limitation, hydroxyl-functional acrylic polymers. The hydroxyl-functional polymer preferably has an equivalent weight from about 300 to about 1500. The acrylic polymer may be produced by copolymerizing an appropriate amount of a hydroxyl-containing ethylenically unsaturated monomer, for example by copolymerizing one or more of the monomers hydroxyethyl acrylate, hydroxyethyl methacrylate, hydroxypropyl acrylate, hydroxypropyl methacrylate, hydroxybutyl acrylate, and hydroxybutyl methacrylate.

Aminoplast crosslinkers have already been described.

In a seventh embodiment, the curable coating composition comprises (a) a compound having isocyanate functionality and carbamate functionality, (b) a material having hydroxyl functionality, and (c) an aminoplast crosslinker.

Compounds (a) having isocyanate functionality and carbamate functionality include, without limitation, diisocyanates, triisocyanurates, or acrylic polymers with a number of isocyanate groups in which a portion but not all of the isocyanate groups have been reacted with an hydroxy carbamate like hydroxypropyl carbamates. An acrylic polymer having both isocyanate and primary carbamate can be made by using appropriate isocyanate- and primary carbamate-functional monomers and polymerizing them with suitable non-functional monomers.

The material (b) having hydroxyl functionality may be a compound, an oligomer, or a polymer having at least one, preferably a plurality of hydroxyl groups, as described above.

Aminoplast crosslinkers have already been described.

In an eighth embodiment, the curable coating composition comprises (a) a compound having isocyanate functionality and ethylenic unsaturation, (b) a material having hydroxyl functionality, and (c) an ethylenically unsaturated crosslinker with a photocatalyst. This composition cures with heat and actinic radiation.

Compounds (a) having isocyanate functionality and ethylenic unsaturation include, without limitation, 2-isocyanatomethylmethacrylate, 2-isocyanatoethylmethacrylate, and benzene, 1-(1-isocyanato-1-methyl ethyl)-4-1-methyl ethynyl)) (commonly known as meta TMI).

The material (b) having hydroxyl functionality may be a compound, an oligomer, or a polymer having at least one, preferably a plurality of hydroxyl groups, as described above.

Suitable examples ethylenically unsaturated crosslinkers include, without limitation, trimethylolpropane triacrylate, pentaerythritol tetraacrylate, and pentaerythritol tetra methacrylate.

Suitable examples of photoinitiators include, without limitation, benzoin ethers, benzyl ketals, dialkoxy acetophenones, hydroxyalkyl phenones, amino, alkyl phenones, benzophenone/amines, thioxanthones/amines, and titanocenes.

The coating compositions of the eighth embodiment are cured with a combination of heat and actinic radiation. Examples of suitable actinic radiation include ultraviolet radiation and electron beam radiation.

Clearcoat compositions of the invention are formulated without pigments. Pigmented coating compositions of the invention may contain pigments and fillers in amounts typically of up to about 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and nonmetallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

The coating composition may include a catalyst to enhance the cure reaction. Such catalysts are well-known in the art and include, without limitation, zinc salts, tin salts, blocked paratoluenesulfonic acid, blocked dinonylnaphthalenesulfonic acid, or phenyl acid phosphate.

A solvent or solvents may be included in the coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, or a combination of any of these. Examples of useful solvents include, without limitation, methyl ethyl ketone, methyl isobutyl ketone, n-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents. In general, protic solvents such as alcohol and glycol ethers are avoided when the coating composition includes the optional polyisocyanate crosslinker, although small amounts of protic solvents can be used even though it may be expected that some reaction with the isocyanate groups may take place during curing of the coating.

Additional agents, for example hindered amine light stabilizers, ultraviolet light absorbers, anti-oxidants, surfactants, stabilizers, wetting agents, rheology control agents, dispersing agents, adhesion promoters, etc. may be incorporated into the coating composition. Such additives are well-known and may be included in amounts typically used for coating compositions.

The coating compositions can be coated on a substrate by spray coating. Electrostatic spraying is a preferred method. The coating composition can be applied in one or more passes to provide a film thickness after cure of typically from about 20 to about 100 microns.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

After application of the coating composition to the substrate, the coating is cured, preferably by heating at a temperature and for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes. Heating can be done in infrared and/or convection ovens. Curable compositions containing ethylenically unsaturated materials are cured by a step including exposure to actinic radiation.

In one embodiment, the coating composition is utilized as the clearcoat of an automotive composite color-plus-clear coating. The pigmented basecoat composition over which it is applied may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition of this invention is generally applied wet-on-wet over a basecoat coating composition as is widely done in the industry. The coating compositions described herein are preferably subjected to conditions so as to cure the coating layers as described above.

The invention is further described in the following examples. The examples are merely illustrative and do not in any way limit the scope of the invention as described and claimed. All parts are parts by weight unless otherwise noted. The examples are prophetic.

EXAMPLES

Synthesis I. Synthesis of an Acid Carbamate Molecule (Compound 1)

A mixture of 308 g of hexahydrophthalic anhydride and 238 g of hydroxypropyl carbamate in 103 g of n-butyl acetate is held at 100-110° C. until infrared spectroscopy shows no trace of anhydride and titration shows that the equivalent weight is 260-275 g/COOH. Total time for the reaction to be complete is 12 hours. At the end of twelve hours, the product (Compound 1) has a non-volatiles of 77.6% by weight and an equivalent weight of 274.9 g/COOH.

Synthesis II. Synthesis of an Acid Carbamate Molecule (Compound 2)

A mixture of 200 g of succinic anhydride and 119 g of hydroxypropyl carbamate in 100 g of toluene is held at 100-110° C. until infrared spectroscopy shows no trace of anhydride and titration shows that the equivalent weight is 210-230 g/equiv. COOH. Total time for the reaction to be complete is 12 hours. At the end of twelve hours, the product (Compound 2) has a non-volatiles of 81% by weight and an equivalent weight of 213 g/COOH.

Synthesis III. Synthesis of Compound with Epoxide and Carbamate Functional Groups (Compound 3)

A mixture of 92 g of epichlorohydrin and 50 g of xylene is slowly added to 120 g hydroxypropyl carbamate in 60 g of xylene kept at 90° C. in a reactor. The reactor is swept continuously by a stream of dry nitrogen exiting through a condenser, the top of which is connected to a running water trap to capture the side product HCl. After the addition, the heating and nitrogen sweep are continued for one hour. Check of the water trap at the end of the reaction period shows no more production of HCl. The final solution (Compound 3) is 61% by weight nonvolatiles with an equivalent weights of 175 g/epoxide and carbamate (each) on solids.

Synthesis IV. Synthesis of Aminoplast Partially Functionalized with Carbamate Groups (Compound 4)

700 g of Cymel 300 (hexamethoxymethyl melamine, HMMM) is mixed with 250 g of methyl carbamate, 400 g of methanol, and 0.5 g of p-toluene sulfonic acid. The mixture is heated to 65° C. After 50 hours, it is calculated from the amount of methyl carbamate still present (determined by gas chromatography), that 25% of the reactive alkoxy groups on the aminoplast have been replaced with carbamate functionalities. Calculated equivalents weights are 117 g/methoxy and 352 g/carbamate.

Synthesis V. Synthesis of Compound with Isocyanate and Carbamate Groups (Compound 5)

198 g of Desmodur® 3390 N is reacted with 40 g of hydroxypropyl carbamate in 100 g of xylene at 80° C., with 0.1 g of dibutyl tin dilaurate catalyst. When the titrated value of % NCO of the reaction mixture stalls (at about 66% of its original value) the reaction is done. The product (Compound 5) has a non-volatile content of 70% and equivalent weights of 325 g/NCO and 654 g/carbamate on solids.

Synthesis VI. Synthesis of Compound with Isocyanate and Ethylenic Unsaturation (Compound 6)

To a solution of 178 g of Desmodur® 3300 (HDI triisocyanurate) in 100 g aromatic 100 kept at 70° C. and under a blanket of oxygen, is added 77 g of 2-hydroxyethyl acrylate and 0.01 g of dibutyl tin dilaurate over 30 minutes. The reactor is held at 70° C. until titration for % NCO shows a decrease in value of about 66% and the decrease stalls. The resulting solution (Compound 6) is 72% by weight nonvolatiles and has equivalent weights of 255 g/isocyanate and 128 g/carbon-carbon double bond on solids.

Synthesis VII. Synthesis of Epoxy-Functional Acrylic Polymer (Polymer 1)

A mixture of acrylic monomers glycidyl methacrylate 99.4 g, n-butyl acrylate 40.6 g, butyl methacrylate 60 g in aromatic 100 10 g and a mixture of tert.-butyl peroxy 2-ethylhexanoate 20 g in 10 g aromatic 100 are co-metered into a reaction vessel containing 60 g of aromatic 100 kept at 140° C. in four hours. After the four hour add, an additional 2 g of tert.-butyl peroxy 2-ethylhexanoate in 10 g of aromatic 100 is metered in over 30 minutes to complete the polymerization. After a hold period of 1 hour, the reaction mixture is cooled for storing. Measured solids are 70% by weight nonvolatiles, equivalent weight is 300 g/epoxy, and a molecular weight measured by gel permeation chromatography against polystyrene standard shows $M_n$ 745, $M_w$ 1400 and polydispersity 1.9. Calculated $T_g$ (by the Fox equation) of the resin is 23° C.

Synthesis VIII. Synthesis of Hydroxy-Functional Acrylic Polymer (Polymer 2)

A mixture of 12.4 g acrylic acid, 48.2 g of 2-hydroxyethyl methacrylate, 16.6 g of 2-ethylhexyl acrylate, 8 g of styrene, 42 g of n-butyl methacrylate, and 7.4 g of methyl methacrylate is added over four hours simultaneously with a solution of 12.4 g of tert-butyl peroxy 2-ethylhexanoate and 6 g of tert-butyl peroxy acetate in 2 g of propylene glycol monopropyl ether to 25 g of propylene glycol monopropyl ether in a reactor at 150° C. After the addition, the product is maintained at 140° C. for an additional hour to complete the conversion. Then, 30 g of methyl propyl ketone is added to bring the resin to a 65% by weight non-volatile solution. Theoretical $T_g$ was calculated by the Fox equation to be 23.4° C. Equivalent weight is 330 g/hydroxyl and molecular weight is $M_n$ 3300, $M_w$ 5850 and polydispersity 1.8 (by GPC using polystyrene standard).

Synthesis IX. Synthesis of Hydroxy-Functional Acrylic Polymer (Polymer 3)

A mixture of 12.4 g acrylic acid, 52.2 g of 2-hydroxypropyl methacrylate, 16.6 g of 2-ethylhexyl acrylate, 8 g of styrene, 42 g of n-butyl methacrylate and 7.4 g of methyl methacrylate is added over 4 hours simultaneously with a solution of 12.4 g of tert-butyl peroxy 2-ethylhexanoate and 6 g of tert.-butyl peroxy acetate in 2 g of propylene glycol monopropyl ether to 28 g of propylene glycol monopropyl ether in a reactor at 150° C. After the addition, the product is maintained at 140° C. for an additional hour to complete the conversion. Then, 32 g of methyl propyl ketone is added to bring the resin to a 65% non-volatile solution. Theoretical $T_g$ is calculated (by Fox equation) to be 23.4° C., measured equivalent weight of 330 g/hydroxyl, and a GPC molecular weight of $M_n$ 3300, $M_w$ 5850 and polydispersity 1.8. Since 2-hydroxypropyl methacrylate is a mixture of 80% secondary and 20% primary hydroxyls, calculated equivalent weights are 412 g/secondary hydroxyl and 1650 g/primary hydroxyl.

Synthesis X. Synthesis of Isocyanate-Functional Acrylic Polymer with Trimethoxysilyl Groups (Polymer 4)

To 750 g of amyl acetate at 110° C. in a reactor, add simultaneously over three hours a mixture of 750 g of 2-ethylhexyl acrylate, 550 g of cyclohexyl methacrylate, 28 g of styrene, 80 g of trimethoxysilylpropyl methacrylate, 120 g 2-isocyanatoethyl methacrylate in 50 g amyl acetate and 4 g of Vazo®-67 in 100 g of aromatic 100. After the addition, the reaction mixture is held at 110° C. for two hours to complete the reaction. The resin has a final solids of 65% by weight nonvolatiles with equivalent weights of 1973 g/NCO and 1580 g/methoxy from the trimethylsilyl group.

Synthesis XI. Synthesis of Isocyanate-Functional Acrylic Polymer (Polymer 5)

To 750 g of amyl acetate at 110° C. in a reactor, add simultaneously over three hours a mixture of 790 g of 2-ethylhexyl acrylate, 590 g of cyclohexyl methacrylate, 28 g of styrene, 120 g 2-isocyanatoethyl methacrylate in 50 g amyl acetate and 4 g of Vazo®-67 in 100 g of aromatic 100. After the addition, the reaction mixture is held at 110° C. for two hours to complete the reaction. The resin has a final solids of 65% by weight nonvolatiles with equivalent weight of 1973 g/NCO.

Synthesis XII. Synthesis of Carboxylic Acid-Functional Acrylic Polymer (Polymer 6)

To 750 g of amyl acetate at 110° C. in a reactor, add simultaneously over three hours a mixture of 750 g of 2-ethylhexyl acrylate, 550 g of cyclohexyl methacrylate, 28 g of styrene, 80 g of acrylic acid, 120 g n-butyl methacrylate in 50 g amyl acetate and 4 g of Vazo®-67 in 100 g of aromatic 100. After the addition, the reaction mixture is held at 110° C. for two hours to complete the reaction. The resin has a final solids of 65% by weight nonvolatiles with equivalent weights of 1375 g/COOH.

Synthesis XII. Synthesis of Carboxylic Acid-Functional Polyester Polymer (Polymer 7)

A combination of 136 g of pentaerythrytol and 616 g of hexahydrophthalic anhydride is loaded in a reactor at 70° C. and heated to 110° C. After holding at 110° C. for 1 hour, the temperature is slowly increased to 120° C. Any exotherm observed is controlled by cooling so the reaction does not go above 140° C. The reactor is held at 120-125° C. infrared spectroscopy shows absence of anhydride peaks. 200 g of xylene is added to make a resin solution at about 80% by weight non-volatiles and an equivalent weight of 188 g/carboxylic acid on solids.

Synthesis XIII. Synthesis of Isocyanate- and Carbamate-Functional Acrylic Polymer (Polymer 8)

To 750 g of amyl acetate at 110° C. in a reactor, add simultaneously over three hours a mixture of 750 g of 2-ethyl, hexyl acrylate, 550 g of cyclohexyl methacrylate, 28 g of styrene, 80 g of carbamate propyl acrylate, and 120 g 2-isocyanatoethyl methacrylate in 50 g amyl acetate and 4 g of Vazo®-67 in 100 g of aromatic 100. After the addition, the reaction mixture is held at 110° C. for two hours to complete the reaction. The resin has a final solids of 65% by weight nonvolatiles with equivalent weights of 1973 g/NCO and 3304 g/carbamate.

Coating Composition Examples 1-18

Thermoset clearcoat coating compositions according to the invention are prepared by combining the materials indicated in the tables that follow.

Examples of Embodiment 1

Groups —COOH and —OCONH$_2$, Epoxide, Aminoplasts

| INGREDIENT | Example 1, g | Example 2, g | Example 3, g | Example 4, g |
|---|---|---|---|---|
| Polymer 1 | 100 | 100 | 100 | |
| TGIC | | | | 100 |
| Compound 1 | 80 | | 63.8 | 135 |
| Compound 2 | | 62 | | |
| Neodecanoic acid | | | 16.2 | 86 |
| Resimine BM-9539[1] | | | 6.0 | |
| Cymel 327[2] | 32 | 32 | 25.6 | 52 |
| Additives Package[3] | 15.5 | 15.5 | 15.5 | 15.5 |
| Exxate 1000 | 1.0 | 1.0 | 1.0 | 1.0 |
| Methyl propyl ketone | 1.0 | 1.0 | 1.0 | 1.0 |
| Total | 229.5 | 211.5 | 283.1 | 390.5 |

Examples of Embodiment 2

Groups —NCO and —Si(—OR$_3$), —NHR, —OH

| INGREDIENTS | Example 5, g | Example 6, g |
|---|---|---|
| Isocyanatopropyl trimethoxy silane[5] | 102 | |
| Polymer 4 | | 303 |
| Cyclohexane 1,4-diamine | 58 | |
| Tris(2-aminoethyl)amine | | 5 |
| Polymer 2 | 700 | 50 |
| Additive package[3] | 15.5 | 15.5 |
| Exxate 1000 | 50 | 10 |

Examples of Embodiment 3

Groups —NCO and —Si(—OR$_3$)—OH (Primary and Secondary)

| INGREDIENTS | Example 7, g | Example 8, g |
|---|---|---|
| Isocyanatopropyl trimethoxy silane[5] | 102 | 102 |
| Polymer 2 | 170 | |
| Pentaerythritol | | 17 |
| Polymer 3 | 600 | 600 |
| Additive package[3] | 15.5 | 15.5 |
| Exxate 1000 | 50 | 10 |

Examples of Embodiment 4

Groups —OH and —Si(—OR)$_3$, —NCO, —OH

| INGREDIENTS | Example 9, g | Example 10, g |
|---|---|---|
| Hydroxymethyl, triethoxysilane | 19 | |
| 4-aminobutyl, triethoxysilane | | 24 |
| Polymer 5 | 304 | |
| pentaerythritol | | 10 |
| Polymer 2 | 150 | |
| Additive package[3] | 15.5 | 15.5 |
| Exxate 1000 | 50 | 10 |

Examples of Embodiment 5

Groups Epoxide and —OCONH$_2$, —COOH Aminoplasts

| INGREDIENTS | Example 11, g | Example 12, g |
|---|---|---|
| Compound 3 | 17 | 17 |
| Polymer 6 | 137 | |
| Polymer 7 | | 23.5 |
| Cymel 327[2] | 10 | 10 |
| Additive package[3] | 15.5 | 15.5 |
| Exxate 1000 | 50 | 10 |

Examples of Embodiment 6

Groups RO—R$_2$—NH— and —OCONHR$_3$, —OH, Aminoplasts

| INGREDIENTS | Example 13, g | Example 14, g |
|---|---|---|
| Compound 4 | 117 | 117 |
| Polymer 2 | 507 | |
| pentaerythritol | | 34 |
| Cymel 327[2] | 26 | 26 |
| Additive package[3] | 15.5 | 15.5 |
| Exxate 1000 | 50 | 10 |

Examples of Embodiment 7

Groups —NCO and —OCONH$_2$, —OH, Aminoplasts

| INGREDIENTS | Example 15, g | Example 16, g |
|---|---|---|
| Compound 5 | 32.5 | |
| Polymer 8 | | 190 |
| Pentaerythritol | | 17 |
| Cymel 327[2] | 40 | 40 |
| Polymer 2 | 52 | |
| Additive package[3] | 15.5 | 15.5 |
| Exxate 1000 | 50 | 10 |

Examples of Embodiment 8

Groups —NCO and —C=C—, —OH, —C=C—

This is a case of dual cure (thermal and actinic) which can be done simultaneously or in stages of thermal followed by actinic radiation. Other way around of actinic radiation followed by thermal is not preferred as the first cure results in high viscosity resin reducing mobility for further reaction.

| INGREDIENTS | Example 17, g | Example 18, g |
|---|---|---|
| 3-isocyanatopropyl acrylate | 16 g | |
| Compound 6 | | 70 |
| Pentaerythritol | | 6.8 |
| Polymer 2 | 51 | |
| Pentaerythritol tetraacrylate | 35 | 35 |
| Additive package[4] | 15.5 | 15.5 |
| Exxate 1000 | 50 | 10 |

[1]Resimene BM-9539 is available from UCB Surface Specialties
[2]CYMEL 327 is available from Cytec Industries.
[3]The additives package included light stabilizers, rheology control agents, a strong acid catalyst, leveling agents, and solvent.
[4]The additive package included photoinitiators along with the usual additives.
[5]obtained from Osi Specialties, under the trade name Silquest A-link 35 silane Examples 1-18 can each be applied to a substrate, for example by atomized spray, in a layer then cured to produce a clear coating layer. The coating layers have good optical properties (e.g., DOI, clarity, gloss) and film properties (e.g., good cure, scratch and mar resistance, and etch resistance).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A curable coating composition, comprising:
   (a) a compound having functionality that reacts in curing the coating consisting of functionality A and functionality B,
   (b) a second material having functionality that reacts with functionality A in curing the coating consisting of functionality C and
   (c) a crosslinker having functionality consisting of a plurality of functional groups D that react at least with functionality B in curing the coating, wherein compound (a) has silyl ether functionality and a functionality selected from the group consisting of isocyanate functionality and hydroxyl functionality and wherein the compound, the second material, and the crosslinker are each different.

2. A curable coating composition according to claim 1, wherein
   compound (a) has isocyanate functionality and silyl ether functionality,
   material (b) has primary and/or secondary amine functionality, and
   crosslinker (c) has hydroxyl functionality.

3. A curable coating composition according to claim 1, wherein
   compound (a) has isocyanate functionality and silyl ether functionality,
   material (b) has secondary hydroxyl functionality, and
   crosslinker (c) has primary hydroxyl functionality.

4. A curable coating composition according to claim 1, wherein
   compound (a) has hydroxyl functionality and silyl ether functionality,
   material (b) has isocyanate functionality, and
   crosslinker (c) has hydroxyl functionality.

5. A method of coating a substrate, comprising steps of
   applying a layer of a curable coating composition according to claim 1 to the substrate and
   curing the applied coating layer.

6. A coated substrate prepared according to the method of claim 5.

7. A method of coating a substrate according to claim 5, wherein in the step of curing the applied coating layer, curing conditions are adjusted to promote substantially sequential reactions of one of the functionalities of compound (a).

8. A coated substrate prepared according to the method of claim 7.

9. A curable coating composition, comprising:
   (a) a compound having functionality that reacts in curing the coating consisting of functionality A and functionality B,
   (b) a second material having functionality that reacts with functionality A in curing the coating consisting of functionality C, and
   (c) a crosslinker having functionality consisting of a plurality of functional groups D that react at least with functionality B in curing the coating,
   wherein compound (a) has carbamate functionality and a functionality selected from the group consisting of alkoxyalkyl amine functionality and isocyanate functionality and wherein the compound, the second material, and the crosslinker are each different.

10. A curable coating composition according to claim 9, wherein
    compound (a) has alkoxyalkyl amine and carbamate functionality,
    material (b) has hydroxyl functionality, and
    crosslinker (c) is an aminoplast crosslinker.

11. A curable coating composition according to claim 9, wherein
    compound (a) has isocyanate and carbamate functionality,
    material (b) has hydroxyl functionality, and
    crosslinker (c) is an aminoplast crosslinker.

12. A method of coating a substrate, comprising steps of
    applying a layer of a curable coating composition according to claim 9 to the substrate and
    curing the applied coating layer.

13. A coated substrate prepared according to the method of claim 12.

14. A method of coating a substrate according to claim 12, wherein in the step of curing the applied coating layer, curing conditions are adjusted to promote substantially sequential reactions of one of the functionalities of compound (a).

15. A coated substrate prepared according to the method of claim 14.

16. A curable coating composition, comprising:
    (a) a compound having functionality that reacts in curing the coating consisting of functionality A and functionality B,
    (b) a second material having functionality that reacts with functionality A in curing the coating consisting of functionality C, and
    (c) a crosslinker having functionality consisting of a plurality of functional groups D that react at least with functionality B in curing the coating,
    wherein
    compound (a) has isocyanate functionality and ethylenic unsaturation,
    material (b) has hydroxyl functionality, and
    crosslinker (c) is an ethylenically unsaturated crosslinker,
    and wherein the compound, the second material, and the crosslinker are each different,
    further wherein the composition includes a photocatalyst.

17. A method of coating a substrate, comprising steps of
    applying a layer of a curable coating composition according to claim 16 to the substrate and
    curing the applied coating layer.

18. A coated substrate prepared according to the method of claim 17.

19. A method of coating a substrate according to claim 16, wherein in the step of curing the applied coating layer, curing conditions are adjusted to promote substantially sequential reactions of one of the functionalities of compound (a).

20. A coated substrate prepared according to the method of claim 19.

* * * * *